March 21, 1961

J. J. RONCI 2,976,049

TALKING GREETING CARD

Filed Dec. 10, 1957

INVENTOR.
JOHN J. RONCI

BY Morse + Altman

ATTORNEYS 2,976,049

TALKING GREETING CARD

John J. Ronci, Norwood, Mass.

Filed Dec. 10, 1957, Ser. No. 701,849
1 Claim. (Cl. 274—16)

This invention relates to a greeting card having means for producing an audible greeting or message. An object of the invention is to make such a card as simply and inexpensively as possible, the card itself being employed as a resonator. A small disc is rotatably mounted on the card, the disc having a sound groove therein. One or more such grooves may be formed in the face of the disc. A spacing washer or the like elevates the disc from the face of the card so that it is not in face-to-face contact with the card. A phonograph needle is mounted on the card in such a way as to press into the sound groove, causing the disc to tilt so that at one point its margin bears against the face of the card. The disc is rotated manually by means of a stylus the end of which is thrust into a small hole through the disc at a point suitably spaced from the axis of rotation.

For a more complete understanding of the invention, reference may be had to the following description thereof and to the drawing, of which:

Figure 1:
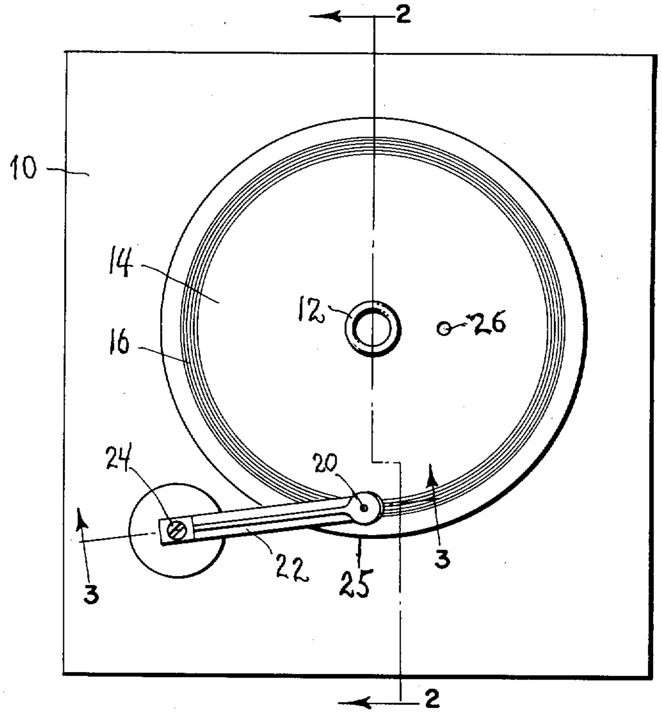
Figure 1 is a plan view of a greeting card embodying the invention.

The card 10 may be of any convenient or desired size and shape and is preferably of a stiff cardboard. Rotatably mounted on the card by any convenient means such as an eyelet 12 is a phonograph disc 14 on a face of which are sound grooves 16 having wavy tracks in which the waves may be vertical or horizontal as desired. The disc 14 is spaced from the card by a suitable washer 18 through which the eyelet 12 extends.

Figure 2:
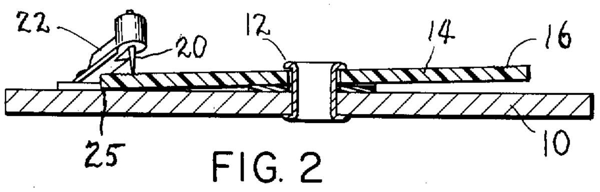
Figure 2 is a section on the line 2—2 of Figure 1.
Figure 3:
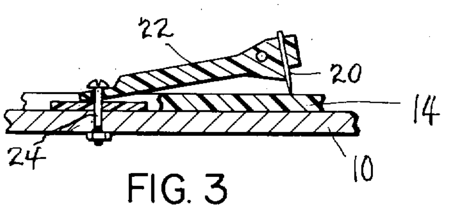
Figure 3 is a section on the line 3—3 of Figure 1.

A phonograph needle 20 is mounted on the end of a needle arm 22 which is fastened to the card 10 by a bolt 24 or the like, the arm being mounted in such a manner, as indicated in Figure 3, that the needle 20 is pressed into one of the grooves 16. This causes the disc to tilt, as indicated in Figure 2, so that its margin or rim bears on the face of the card 10 at a point 25 near the needle 20.

A small hole 26 is made through the disc at a point conveniently spaced from the turning axis. The disc can be readily rotated by means of a stylus (not shown), the end of which is thrust through the hole 26, the disc then being manually rotated. The vibrations of the needle in the groove causes the disc itself to vibrate. These vibrations are transmitted to the card 10 by contact at the point 25 so that the card resonates and thus amplifies the resultant sound waves.

Figure 4:
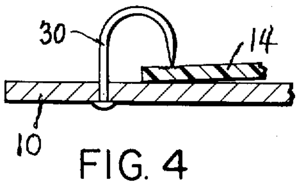
Figure 4 is a fragmentary sectional view of a modified form of the invention.

A simplified unitary needle and arm 30 may be mounted on the card, as indicated in Figure 4, to press the point of the needle into the sound groove.

The vibrations imparted to the card by the edge of the disc which bears thereon are amplified by vibrations of the same kind travelling along the needle arm and imparted to the card through the needle arm mounting, and by vibrations reaching the card through the center mounting of the disc.

What is claimed is:

An audible greeting card comprising a sheet of semi-rigid cardboard, a small phonograph disc rotatably mounted on said sheet, a central pivot connecting said disc to said sheet, a spacing washer between the central portion of said disc and the adjacent portions of said sheet, a needle arm fastened to said sheet near the edge of said disc, and a needle mounted on said arm bearing against said disc near the edge thereof tilting the disc and pressing the adjacent edge portion thereof against the sheet.

References Cited in the file of this patent

UNITED STATES PATENTS

| | | |
|---|---|---|
| 1,652,683 | Pierman | Dec. 13, 1927 |
| 2,005,620 | Griffin | June 18, 1935 |
| 2,470,435 | Gold | May 17, 1949 |
| 2,479,790 | Strumor | Aug. 23, 1949 |

FOREIGN PATENTS

| | | |
|---|---|---|
| 1,007,839 | France | May 12, 1952 |
| 287,273 | Switzerland | Nov. 30, 1953 |
| 1,066,423 | France | June 4, 1954 |